(12) United States Patent
Morgan et al.

(10) Patent No.: US 6,364,249 B1
(45) Date of Patent: Apr. 2, 2002

(54) ENGINE INTEGRATED WITH ROTARY WING AIRCRAFT TRANSMISSION

(75) Inventors: Keith Martin Morgan, Montreal; Ian Alexander MacFarlane, St. Bruno de Montarville; Lazar Mitrovic, Longueuil, all of (CA)

(73) Assignee: Pratt & Whitney Canada Corp., Quebec (CA)

( * ) Notice: Subject to any disclaimer, the term of this patent is extended or adjusted under 35 U.S.C. 154(b) by 0 days.

(21) Appl. No.: 09/409,991

(22) Filed: Sep. 30, 1999

(51) Int. Cl.[7] .............................................. B64C 27/00
(52) U.S. Cl. ............................ 244/17.11; 244/17.11; 244/17.27; 244/54; 244/60; 416/170 R
(58) Field of Search .......................... 244/17.11, 17.17, 244/53 R, 54, 60, 17.27; 416/500, 170 R

(56) References Cited

U.S. PATENT DOCUMENTS

| | | | | |
|---|---|---|---|---|
| 2,470,155 A | * | 5/1949 | Forsyth | 244/60 |
| 2,596,363 A | * | 5/1952 | Breguet | 244/60 |
| 2,937,703 A | * | 5/1960 | Chamberlin | 416/170 R |
| 3,050,275 A | * | 8/1962 | Kottsieper | 244/17.27 |
| 3,455,182 A | * | 7/1969 | Kelley | 244/60 |
| 3,799,473 A | | 3/1974 | Bortel | |
| 3,921,940 A | * | 11/1975 | Mouille | 244/17.27 |
| 3,977,632 A | | 8/1976 | Watson | |
| 4,163,535 A | * | 8/1979 | Austin | 244/17.11 |
| 4,458,862 A | * | 7/1984 | Mouille et al. | 244/17.27 |
| 4,479,619 A | | 10/1984 | Saunders et al. | |
| 4,489,625 A | | 12/1984 | White | |
| 4,632,337 A | | 12/1986 | Moore | |
| 4,659,287 A | | 4/1987 | Garavaglia et al. | |
| 4,783,023 A | | 11/1988 | Jupe | |
| 4,899,959 A | | 2/1990 | Weiler | |

FOREIGN PATENT DOCUMENTS

| | | |
|---|---|---|
| GB | 753970 | 10/1956 |
| NL | 86440 | 5/1957 |
| WO | 84/00339 | 2/1984 |

OTHER PUBLICATIONS

Die Modernen Flugtriebwerke by Kurt Grasmann 1982, p. 59, 82, 83 (1982) + English translation of Die Modernen Flugtriebwerke.

* cited by examiner

Primary Examiner—Galen L. Barefoot
(74) Attorney, Agent, or Firm—Bachman & LaPointe, P.C.

(57) ABSTRACT

A power plant and transmission arrangement for a helicopter wherein the helicopter engine is integrated to the helicopter transmission to form therewith a single unit rigidly mounted to the helicopter frame. By so integrating the engine to the helicopter transmission the center of gravity of the engine can be placed closer to the rotor mast of the helicopter, thereby enhancing the stability and the handling characteristics of the helicopter.

20 Claims, 2 Drawing Sheets

ENGINE INTEGRATED WITH ROTARY WING AIRCRAFT TRANSMISSION

BACKGROUND OF THE INVENTION

1. Field of the Invention

The present invention relates to a power plant and transmission arrangement suited for rotary wing aircraft and, more particularly, to a power plant and transmission arrangement comprising an engine integrated with a transmission.

2. Description of the Prior Art

As seen in FIG. 1, conventional helicopter power plants typically comprise an engine 10 with a reduction gearbox 12 mounted thereto as a modular unit. The engine 10 and the reduction gearbox 12 are conjointly mounted to a helicopter frame 14 and coupled to a main transmission 16 via a flexible coupling and drive shaft arrangement 18. The main transmission 16 is mounted on the helicopter frame 14 separately from the reduction gearbox 12 and is drivingly connected to a rotor mast 20, a tail rotor (not shown) and auxiliary equipment (not shown) of the helicopter in order to transmit power thereto. Alternatively, it has been proposed, as seen in FIG. 2, to suppress the reduction gearbox at the output of the engine 10' and to couple the same to the main transmission 16' only via the clutch and coupling shaft arrangement 18'.

Such arrangements wherein the transmission 16/16' is mounted to the helicopter frame 14/14' separately from the engine 10/10' has in the past been found necessary to adequately support the loads of the rotor mast 20/20' and dampen the vibrations thereof. However, one drawback associated with power plant and transmission arrangement of the type described above resides in the fact that the coupling shaft has to be fairly long for compensating even slight longitudinal and angular displacements of the main transmission, thereby negatively affecting the helicopter stability due to the substantial spacing between the engine center of gravity and the rotor mast of the helicopter.

Accordingly, attempts have been made to reduce the required length of the coupling shaft. For instance, U.S. Pat. No. 4,899,959 issued on Feb. 13, 1990, to Weiller, discloses a helicopter power plant and transmission arrangement wherein the length of the coupling shaft joining the main transmission to the engine is minimized by the provision of a flex coupling between the engine and the reduction gearbox. One disadvantage associated to the use of flexible couplings is that they significantly limit the speed at which the coupling shaft may be driven and consequently the engine speed of the helicopter.

Therefore, there is a need for a new helicopter power plant and transmission arrangement adapted to improve the stability and handling characteristics of a helicopter without significantly limiting engine speed thereof.

SUMMARY OF THE INVENTION

It is therefore an aim of the present invention to provide a new rotary wing aircraft power plant and transmission arrangement adapted to improve aircraft stability by placing the center of gravity of the power plant closer to a main rotor mast of the rotary wing aircraft.

It is also an aim of the present invention to provide a new rotary wing aircraft power plant and transmission arrangement having a reduced overall weight.

It is a further aim of the present invention to provide a rotary wing aircraft power plant and transmission arrangement wherein the transmission is combined into a single module with the power plant.

It is a still further aim of the present invention to provide a rotary wing aircraft power plant and transmission arrangement which is relatively economical to manufacture.

Therefore, in accordance with the present invention, there is provided a power plant and transmission arrangement for a rotary wing aircraft having a frame, comprising engine means for generating mechanical power, the engine means including a casing, and a transmission directly connected to the engine means for transmitting power from the engine means to driven components of the rotary wing aircraft, the transmission including a housing, the housing and the casing being integrated together to ensure that the engine means and the transmission act as a single unit with respect to the frame. By so integrating the engine means to the transmission, it becomes possible to reduce the spacing between the center of gravity of the engine means and the rotor mast of the rotary wing aircraft, thereby advantageously improving the handling characteristics of the rotary wing aircraft.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
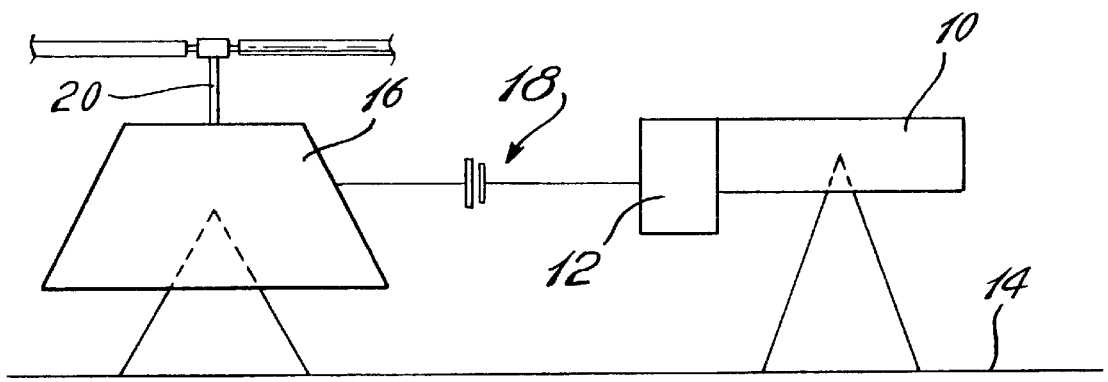
FIG. 1 is a schematic side elevational view of a typical power plant and transmission arrangement of a helicopter in accordance with a first arrangement of the prior art.
Figure 2:
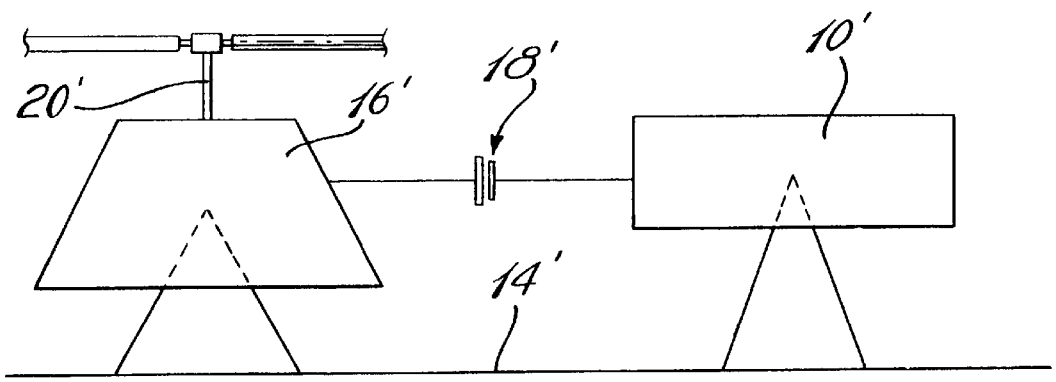
FIG. 2 is a schematic side elevational view of a second power plant and transmission arrangement of the prior art.
Figure 3:
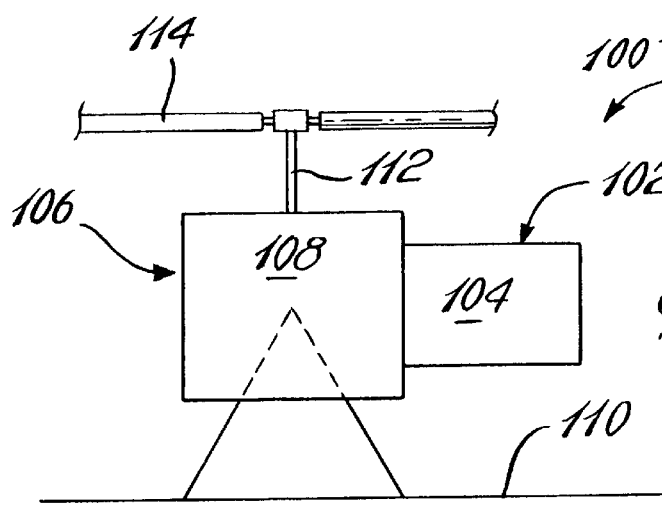
FIG. 3 is a schematic side elevational view of a helicopter power plant and transmission arrangement in accordance with a first embodiment of the present invention.
Figure 4:
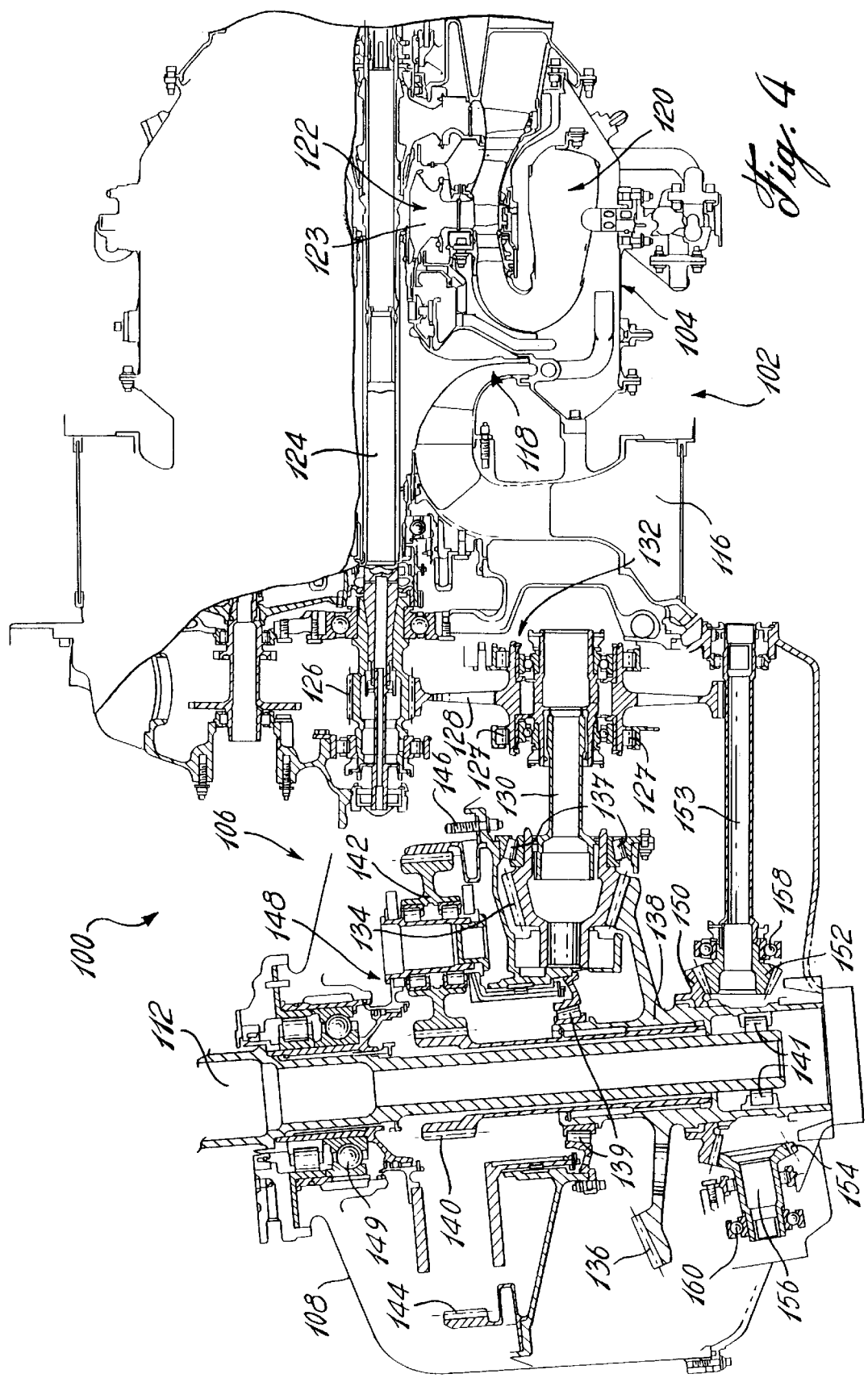
FIG. 4 is a cross-sectional view of a power plant and transmission arrangement, illustrating the details of a first embodiment of the present invention.

Referring to the drawings, and in particular to FIGS. 3 and 4, a helicopter power plant and transmission arrangement in accordance with the present invention and generally designated by reference numeral 100 will be described.

As seen in FIG. 3, the helicopter power plant and transmission arrangement 100 generally comprises a gas turbine engine 102 mounted in a casing 104 and directly drivingly connected to a helicopter transmission 106 mounted within a housing 108. The casing 104 and the housing 108 are rigidly connected to each other to ensure that the gas turbine engine 102 and the helicopter transmission 106 be modularly assembled together into a single unit supported by the helicopter frame 110 in a suitable manner. By integrating the gas turbine engine 102 to the helicopter transmission 106, the total installed length of the power plant and transmission arrangement 100 is significantly reduced, thereby allowing the center of gravity of the gas turbine engine 102 to be placed as closed as possible to the rotor mast 112 of the helicopter in order to enhance the stability and handling characteristics thereof. Furthermore, this advantageously eliminates the need of having flex coupling between the helicopter transmission 106 and the gas turbine engine 102 to compensate for disaligments which may arise when the gas turbine engine and the helicopter transmission are separately supported on the helicopter frame, as in known prior art arrangements.

The helicopter transmission 106 transmits the mechanical power generated by the gas turbine engine 102 to the rotor mast 112 to which the rotor blades 114 are radially mounted, as is well known in the art. The helicopter transmission 106 further transmits power to the helicopter tail rotor (not shown) and auxiliary equipment (not shown), such as oil and hydraulic pumps. The helicopter transmission 106 also serves to reduce the speed of rotation of the gas turbine engine 102 to levels suitable for rotating the various driven components of the helicopter.

As seen in FIG. 4, the gas turbine engine 102 of the illustrated embodiment comprises a radial air inlet 116 through which air may pass to access a centrifugal compressor section 118 wherein the pressure and the temperature of the incoming air is raised before passing into a combustion chamber 120 disposed downstream from the compressor section 118. Fuel is sprayed into the combustion chamber 120 and the resulting mixture of fuel and air is burned to produce hot, expanding gases that rush into a turbine section 122 so as to cause turbine blades 123 rigidly mounted on a main shaft 124 to rotate.

The main shaft 124 of the gas turbine engine 102 is journaled by suitable bearings relative to the casing 104 and is provided at an output end thereof with a pinion 126 meshed with a reduction gear 128 mounted at a first end of a drive shaft 130 extending in parallel to the main shaft 124. The reduction gear is journaled by suitable bearings, such as at 127, relative to the casing 104. The pinion 126 together with the reduction gear 128 provide a first speed reduction stage. According to an embodiment of the present invention, the main shaft 124 rotates at about 40000 rpm, whereas the drive shaft 130 rotates at about 8000 rpm.

The reduction gear 128 is mounted to the drive shaft 130 via a sprag clutch 132 to ensure that nothing will prevent the rotor mast 112 and the tail rotor (not shown) to auto-rotate in the even of a power failure of the gas tubing engine 102. As it will be appreciated, the location of the sprag clutch 132 further ensure that the oil system (not shown) can still function to protect the helicopter transmission components in the event of an auto-rotation.

The drive shaft 130 is provided at an output end thereof with a bevel gear 134 journaled by suitable bearings 137 relative to the housing 108. The bevel gear 134 is meshed with an associated reduction bevel gear 136 forming an integral part of a tubular gear support structure 138 mounted for rotation about the rotor mast 112 of the helicopter via anti-friction bearings 139 mounted to the housing 108 by suitable means. Bearings 141 are provided internally of the tubular gear support structure 138 at a lower end portion thereof for ensuring proper alignment of the rotor mast 112 relative to the tubular gear support structure 138. The bevel gear 134 together with the reduction bevel gear 136 provide a second speed reduction stage. According to an embodiment of the present invention, the drive shaft 130 rotates at about 8000 rpm, whereas the tubular gear support structure 138 rotates at about 2300 rpm.

A sun gear structure 140 is disposed about the rotor mast 112 and is secured at a lower end portion thereof to an inner surface of the tubular gear support structure 138. The sun gear structure 140 is meshed at an upper end thereof with a planet gear 142 which is also meshed with an idle internal ring gear 144 concentrically disposed about the sun gear 140 and secured to the housing 108, such as at 146. The planet gear 142 is carried by a planet carrier 148 which is, in turn, rigidly connected to the rotor mast 112 and journaled by suitable anti-friction bearings, such as at 149, relative to the housing 108. The above described planetary gear train provides a third speed reduction stage. According to a preferred embodiment of the preset invention, the sun gear structure 140 rotates conjointly with the tubular gear support structure 138 at about 2300 rpm, whereas the rotor mass 112 rotates at about 400 rpm.

The tubular gear support structure 138 is provided at a lower end portion thereof with a bevel gear 150 meshed on one side of the rotor mast 112 with an associated reduction bevel gear 152 fixedly mounted to a tail rotor drive shaft 153 and on the other side of the rotor mast 112 with a second associate reduction bevel gear 154 fixedly mounted on an auxiliary equipment drive shaft 156. Bearings 158 and 160 are provided to respectively journal the tail rotor drive shaft 153 and the auxiliary equipment drive shaft 156 relative to the housing 108. According to a preferred embodiment of the present invention, the tubular gear support structure rotates at about 2300 rpm, whereas the tail rotor drive shaft rotates at about 6000 rpm.

From the above, it can be seen that the tubular gear support structure 138 operates as a multiple output gear to transmit power from the drive shaft 130 to the rotor mast 112, the tail rotor drive shaft 153 and the auxiliary equipment drive shaft 156.

It is noted that the rotor mast 112 may be supported by a rigid mount or, alternatively, by an appropriate flexible structure mounted to the helicopter frame.

Furthermore, it is understood that the gas turbine engine could be provided with an axial air inlet instead of the above described radial air inlet 116. In the case of axial air intake, the compressor section of the gas turbine engine could be disposed in front of the rotor mast 112 and the turbine section at the back thereof.

It is also understood that more than one gas turbine engine 102 could be provided and that more or less than three speed reduction stages could also be used.

The above described power plant and transmission arrangement provides optimum cost and weight reduction by locating all the engine driven components and helicopter transmission driven components within a single envelop formed by the rigidly interconnected casing 104 and housing 108. This advantageously contributes to increase the helicopter payload. Moreover, only one oil system (not shown) can be used instead of two separate systems.

What is claimed is:

1. A power plant and transmission arrangement for driving driven components of a rotary wing aircraft having a rotor mast and a frame, comprising a gas turbine engine with an engine axis and with a gearcase, and a single transmission integrated to the gearcase for transmitting power from said gas turbine engine to driven components of the rotary wing aircraft, the engine axis being substantially horizontal while the rotary wing aircraft is in a normal flight position, the gas turbine engine and the single transmission being included as a single unit in a housing for mounting said single unit to the frame with a center of gravity of said engine located adjacent an output of said transmission, thereby effectively reducing an installed length of said power plant and transmission arrangement.

2. A power plant and transmission arrangement as defined in claim 1, wherein said housing and said gearcase are modularly assembled to form said single unit.

3. A power plant and transmission arrangement as defined in claim 2, wherein said housing and said gearcase are removably fastened together.

4. A power plant and transmission arrangement as defined in claim 1, wherein said gas turbine engine includes a main shaft journaled relative to said gearcase, and wherein said transmission includes a multiple output gear journaled with respect to said housing, said main shaft being drivingly connected to an input of said multiple output gear in order to simultaneously transmit mechanical power to the rotor mast and other driven components of the rotary wing aircraft.

5. A power plant and transmission arrangement as defined in claim 4, wherein said multiple output gear is mounted for rotation about the rotor mast of the rotary wing aircraft.

6. A power plant and transmission arrangement as defined in claim 5, wherein said main shaft is drivingly connected to said input of said multiple output gear through a drive shaft having input and output ends respectively journaled relative to said gearcase and said housing.

7. A power plant and transmission arrangement as defined in claim 6, wherein said multiple output gear has a first output forming part of a planetary gear train used to transmit mechanical power to the rotor mast of the rotary wing aircraft.

8. A power plant and transmission arrangement as defined in claim 7, wherein said first output is a sun gear meshed with a planet gear which is also meshed with a ring gear secured to said housing and concentrically disposed relative to said sun gear, said planet gear being carried by a planet carrier connected to the rotor mast of the rotary wing aircraft for rotation therewith.

9. A power plant and transmission arrangement as defined in claim 7, wherein said multiple output gear is further provided with a second output which forms a common driving source for the driven components of the rotary wing aircraft other than the rotor mast.

10. A power plant and transmission arrangement as defined in claim 4, wherein a clutch is provided for selectively disconnecting said main shaft from said transmission.

11. A power plant and transmission arrangement as defined in claim 1, wherein said gas turbine engine has a radial air intake.

12. A power plant and transmission arrangement as defined in claim 1, wherein said rotary wing aircraft is a helicopter.

13. A power plant and transmission arrangement in combination with a rotary wing aircraft having a rotor mast and a frame, comprising a gas turbine engine with an engine axis and with a gearcase, and a single transmission integrated to the gearcase for transmitting power from said gas turbine engine to the rotor mast, the rotor mast being at right angles to the engine axis, the gas turbine engine and the single transmission being jointly mounted to the frame and included as a single unit in a housing for mounting said single unit to the frame with a center of gravity of said engine located adjacent said rotor mast, thereby effectively reducing an installed length of said power plant and transmission arrangement.

14. A combination as defined in claim 13, wherein said housing and said gearcase are modularly assembled to form said single unit.

15. A combination as defined in claim 14, wherein said housing and said gearcase are removably fastened together.

16. A combination as defined in claim 13, wherein said gas turbine engine includes a main shaft journaled relative to said gearcase, and wherein said transmission includes a multiple output gear journaled with respect to said housing, said main shaft being drivingly connected to an input of said multiple output gear in order to simultaneously transmit mechanical power to the rotor mast and other driven components of the rotary wing aircraft.

17. A combination as defined in claim 16, wherein said multiple output gear is mounted for rotation about the rotor mast of the rotary wing aircraft.

18. A combination as defined in claim 17, wherein said main shaft is drivingly connected to said input of said multiple output gear through a drive shaft having input and output ends respectively journaled relative to said gearcase and said housing.

19. A combination as defined in claim 18, wherein said multiple output gear has a first output forming part of a planetary gear train used to transmit mechanical power to the rotor mast of the rotary wing aircraft.

20. A combination as defined in claim 19, wherein said first output is a sun gear meshed with a planet gear which is also meshed with a ring gear secured to said housing and concentrically disposed relative to said sun gear, said planet gear being carried by a planet carrier connected to the rotor mast of the rotary wing aircraft for rotation therewith.

* * * * *